US010422696B2

(12) United States Patent
Warashina et al.

(10) Patent No.: US 10,422,696 B2
(45) Date of Patent: Sep. 24, 2019

(54) OPTICAL MODULE

(71) Applicant: HAMAMATSU PHOTONICS K.K., Hamamatsu-shi, Shizuoka (JP)

(72) Inventors: Yoshihisa Warashina, Hamamatsu (JP); Tomofumi Suzuki, Hamamatsu (JP); Kohei Kasamori, Hamamatsu (JP); Ryosuke Okumura, Hamamatsu (JP); Kyosuke Kotani, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/072,634

(22) PCT Filed: Feb. 2, 2017

(86) PCT No.: PCT/JP2017/003727
§ 371 (c)(1),
(2) Date: Jul. 25, 2018

(87) PCT Pub. No.: WO2017/135357
PCT Pub. Date: Aug. 10, 2017

(65) Prior Publication Data
US 2019/0033136 A1 Jan. 31, 2019

(30) Foreign Application Priority Data
Feb. 2, 2016 (JP) .................. 2016-017956

(51) Int. Cl.
*G01B 11/00* (2006.01)
*G01J 3/453* (2006.01)
(Continued)

(52) U.S. Cl.
CPC ............ *G01J 3/4535* (2013.01); *G01B 11/00* (2013.01); *G01B 11/02* (2013.01); *G01J 3/02* (2013.01); *G01J 3/45* (2013.01); *G02B 26/06* (2013.01)

(58) Field of Classification Search
CPC .......... G01B 9/020249; B81B 2201/03; B81B 2201/033; B81B 2201/042
See application file for complete search history.

(56) References Cited

U.S. PATENT DOCUMENTS 4,537,508 A   8/1985  Doyle
7,889,354 B2* 2/2011  Franz ................... G01B 9/0209
                                                          356/497
(Continued)

FOREIGN PATENT DOCUMENTS

JP    H03-46523 A     2/1991
JP    2005-274550 A  10/2005
(Continued)

OTHER PUBLICATIONS

International Preliminary Report on Patentability dated Aug. 16, 2018 for PCT/JP2017/003727.

*Primary Examiner* — Jonathan M Hansen
(74) *Attorney, Agent, or Firm* — Drinker Biddle & Reath LLP

(57) ABSTRACT

An optical module includes an actuator that includes a movable part to be moved along a predetermined direction; a first interference optical system that includes a first movable mirror, a first stationary mirror, and a first beam splitter; and a second interference optical system that includes a second movable mirror, a second stationary mirror, and a second beam splitter. The first interference optical system is adapted so that first light reciprocates m times (m is a natural number) between the first beam splitter and the first movable mirror along the predetermined direction. The second inter-
(Continued)

ference optical system is adapted so that second light reciprocates n times (n is a natural number greater than m) between the second beam splitter and the second movable mirror along the predetermined direction.

9 Claims, 7 Drawing Sheets

(51) Int. Cl.
  *G01J 3/02* (2006.01)
  *G01J 3/45* (2006.01)
  *G02B 26/06* (2006.01)
  *G01B 11/02* (2006.01)

(56) References Cited

U.S. PATENT DOCUMENTS

| | | | |
|---|---|---|---|
| 2006/0098204 A1 | 5/2006 | Kenda et al. | |
| 2010/0315647 A1* | 12/2010 | Saadany | G01J 3/02 356/450 |
| 2018/0120156 A1* | 5/2018 | Suzuki | G01J 3/0289 |

FOREIGN PATENT DOCUMENTS

| | | |
|---|---|---|
| JP | 2010-170029 A | 8/2010 |
| JP | 2013-522600 A | 6/2013 |
| WO | WO-2011/112676 A1 | 9/2011 |

* cited by examiner

OPTICAL MODULE

TECHNICAL FIELD

The present disclosure relates to an optical module in which a micro electro mechanical system (MEMS) technology is used.

BACKGROUND ART

Patent Literature 1 discloses an optical module in which an interference optical system is formed on a silicon-on-insulator (SOI) substrate by a MEMS technology. Since the optical module can provide a Fourier transform-type infrared spectrometer (FTIR) that has a small size and is inexpensive, the optical module is noted.

CITATION LIST

Patent Literature

Patent Literature 1: Japanese Unexamined Patent Publication No. 2010-170029

SUMMARY OF INVENTION

Technical Problem

The position of a movable mirror, which forms an interference optical system for measurement, is required to be accurately detected in the above-mentioned optical module. The reason for this is that the positional accuracy of the movable mirror is particularly important to determine major parameters of a spectrometer, such as wavelength reproducibility, wavelength resolution, and an S/N ratio.

An object of the present disclosure is to provide an optical module that can accurately detect the position of a movable mirror forming an interference optical system for measurement.

Solution to Problem

An optical module according to an aspect of the present disclosure includes: an actuator that includes a movable part to be moved along a predetermined direction; a first interference optical system that includes a first movable mirror provided on the movable part and a first stationary mirror and a first beam splitter of which positions are fixed, and obtains an interference wave of first light; and a second interference optical system that includes a second movable mirror provided on the movable part and a second stationary mirror and a second beam splitter of which positions are fixed, and obtains an interference wave of second light. The first interference optical system is adapted so that the first light reciprocates m times (m is a natural number) between the first beam splitter and the first movable mirror along the predetermined direction, and the second interference optical system is adapted so that the second light reciprocates n times (n is a natural number greater than m) between the second beam splitter and the second movable mirror along the predetermined direction.

In the optical module, the first light is split into first light travelling to the first movable mirror and first light travelling to the first stationary mirror by the first beam splitter, and the first light split to travel to the first movable mirror and the first light split to travel to the first stationary mirror are composed by the first beam splitter after the first light split to travel to the first movable mirror reciprocates m times (m is a natural number) along the predetermined direction. On the other hand, the second light is split into second light travelling to the second movable mirror and second light travelling to the second stationary mirror by the second beam splitter, and the second light split to travel to the second movable mirror and the second light split to travel to the second stationary mirror are composed by the second beam splitter after the second light split to travel to the second movable mirror reciprocates n times (n is a natural number greater than m) along the predetermined direction. Accordingly, a phase difference occurring on the interference wave of the second light is larger than a phase difference that occurs on the interference wave of the second light in a case in which the second light travelling to the second movable mirror reciprocates, for example, n times along the predetermined direction. This is equivalent to the use of light having a shorter wavelength as the second light, and means that a resolution for the detection of a position based on the interference wave of the second light is high. Here, since the first and second movable mirrors are provided on the movable part, the first and second movable mirrors are moved along the predetermined direction while being synchronized with each other. Accordingly, it is possible to detect the position of the first movable mirror in the predetermined direction by detecting the position of the second movable mirror in the predetermined direction on the basis of the interference wave of the second light. It is possible to accurately detect the position of the movable mirror, which forms an interference optical system for measurement, (that is, first movable mirror) by using the first light as light for measurement and using the second light as light for the detection of a position as described above.

In the optical module according to the aspect of the present disclosure, m may be 1 and n may be 2. According to this, it is possible to detect the position of the movable mirror, which forms the interference optical system for measurement, (that is, the first movable mirror) with sufficient accuracy while inhibiting the structures of the first and second interference optical systems from being complicated.

In the optical module according to the aspect of the present disclosure, the second light may be a laser light. According to this, even though the number of times of reciprocation of the second light, which travels to the second movable mirror, along the predetermined direction is increased, the interference wave of the second light can be efficiently obtained.

In the optical module according to the aspect of the present disclosure, the first movable mirror may be provided at one end portion of the movable part in the predetermined direction, and the second movable mirror may be provided at the other end portion of the movable part in the predetermined direction. According to this, the movable part can be moved with a good balance along the predetermined direction.

The optical module according to the aspect of the present disclosure may further include a first light incident part that allows the first light to be incident, a first light-emitting part that emits the interference wave of the first light, a second light incident part that allows the second light to be incident, and a second light-emitting part that emits the interference wave of the second light. According to this, the degree of freedom in designing the first and second interference optical systems can be improved.

The optical module according to the aspect of the present disclosure may further include a light-emitting element that outputs the second light, and a light-receiving element that detects the interference wave of the second light. According to this, since the light-emitting element and the light-receiving element are mounted on the optical module, the optical module can be easily handled.

In the optical module according to the aspect of the present disclosure, the first movable mirror and the second movable mirror may be provided at an end portion of the movable part in the predetermined direction and may share at least a part thereof. According to this, the optical module can be reduced in size.

The optical module according to the aspect of the present disclosure may further include a first light incident part that allows the first light to be incident, a second light incident part that allows the second light to be incident, and a light-emitting part that emits the interference wave of the first light and the interference wave of the second light. According to this, the degree of freedom in designing the first and second interference optical systems can be improved.

The optical module according to the aspect of the present disclosure may further include a light-emitting element that outputs the second light, and a light-receiving element that detects the interference wave of the first light and the interference wave of the second light. According to this, since the light-emitting element and the light-receiving element are mounted on the optical module, the optical module can be easily handled.

Advantageous Effects of Invention

According to the present disclosure, it is possible to provide an optical module that can accurately detect the position of a movable mirror forming an interference optical system for measurement.

DESCRIPTION OF EMBODIMENTS

Figure 1:
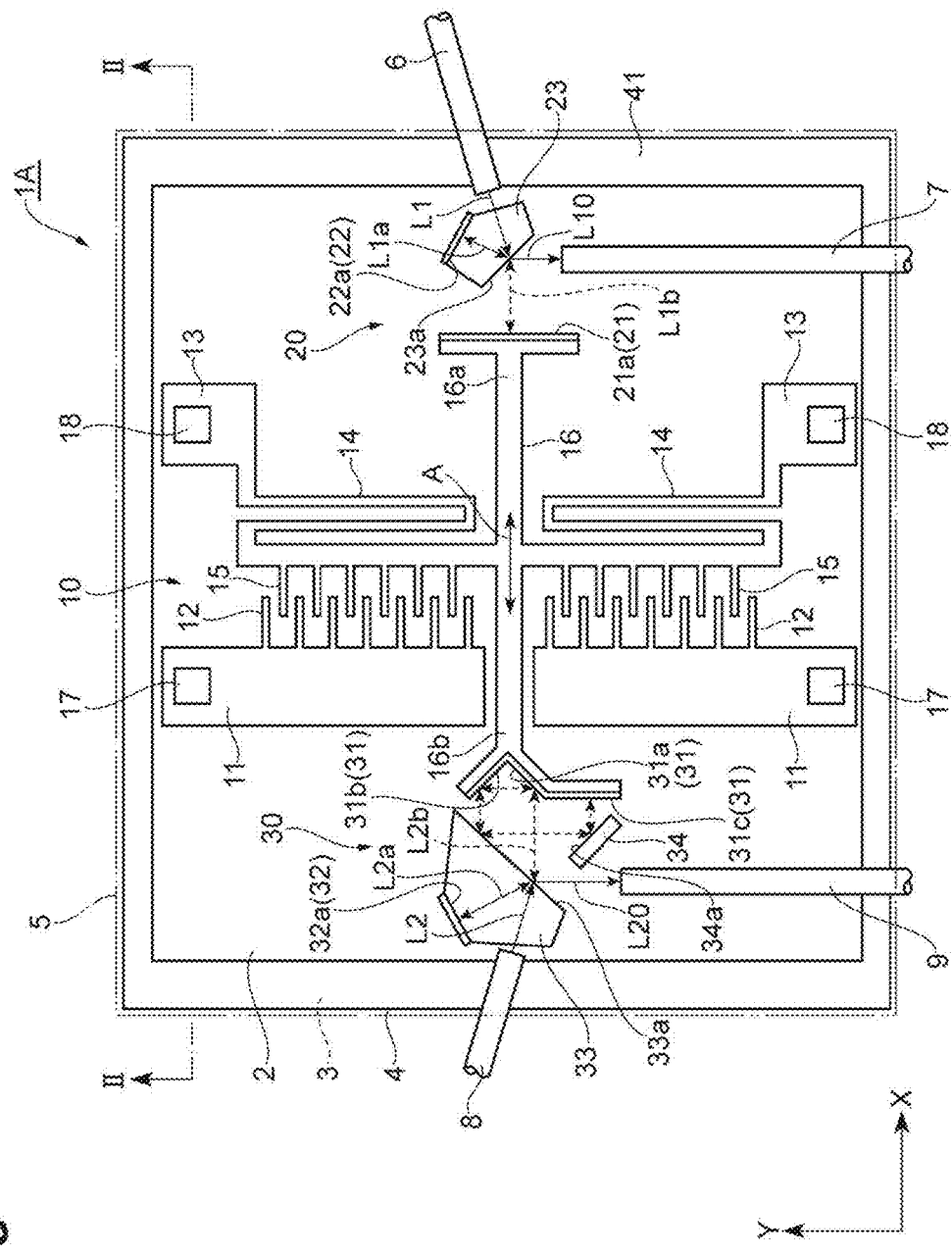
FIG. 1 is a plan view of an optical module of a first embodiment.

Embodiments of the present disclosure will be described in detail below with reference to the drawings. Meanwhile, the same portions or corresponding portions will be denoted in the respective drawings by the same reference numerals and the repeated description thereof will be omitted.

First Embodiment

Figure 2:
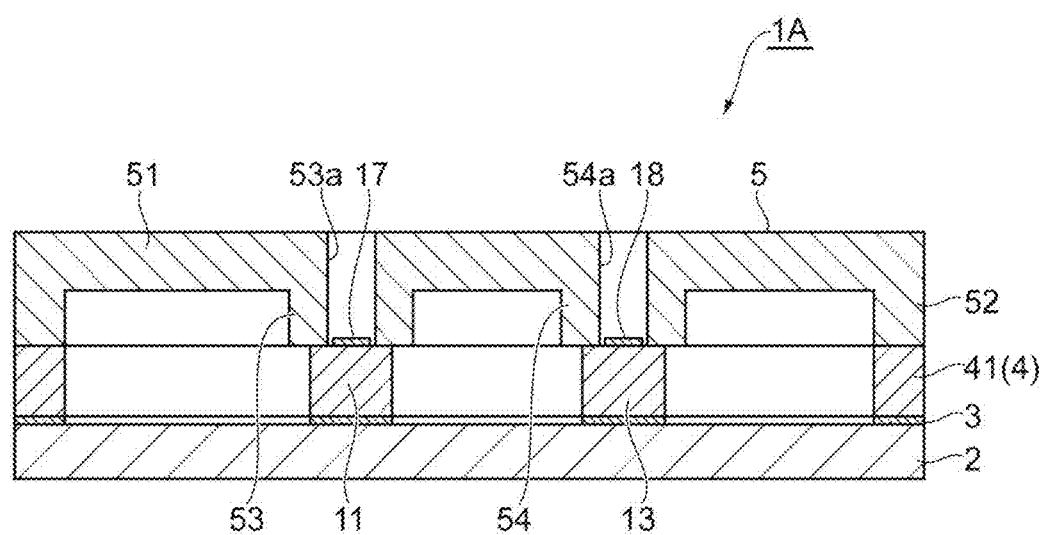
FIG. 2 is a cross-sectional view taken along line II-II of FIG. 1.

As illustrated in FIGS. 1 and 2, an optical module 1A includes a substrate 2, an insulating layer 3 that is formed on the substrate 2, a semiconductor layer 4 that is formed on the insulating layer 3, and a cap 5. An actuator 10, a first interference optical system 20, a second interference optical system 30, and a frame part 41 are mainly formed on the substrate 2 by a part of the semiconductor layer 4. The frame part 41 surrounds the actuator 10, the first interference optical system 20, and the second interference optical system 30, and is fixed to the substrate 2 with the insulating layer 3 interposed therebetween. The optical module 1A is a MEMS device that is formed from an SOI substrate. That is, in this embodiment, the substrate 2 and the semiconductor layer 4 are made of silicon, and the insulating layer 3 is made of silicon oxide.

The actuator 10 is an electrostatic actuator, and includes a pair of first stationary parts 11, first comb-tooth parts 12, a pair of second stationary parts 13, support parts 14, second comb-tooth parts 15, and a movable part 16.

The pair of first stationary parts 11 is arranged in parallel in a Y-axis direction, and is fixed to the substrate 2 with the insulating layer 3 interposed therebetween. The first comb-tooth parts 12 are provided on one side surface of each first stationary part 11. A portion of the insulating layer 3, which is positioned directly beneath the first comb-tooth parts 12, is removed, so that the first comb-tooth parts 12 are in a state in which the first comb-tooth parts 12 float above the substrate 2. The first stationary parts 11 and the first comb-tooth parts 12 are integrally formed of a part of the semiconductor layer 4. Each of the first stationary parts 11 is provided with a first electrode 17.

The pair of second stationary parts 13 is arranged in parallel in the Y-axis direction, and is fixed to the substrate 2 with the insulating layer 3 interposed therebetween. The pair of second stationary parts 13 is disposed on one side of the pair of first stationary parts 11. The support part 14 extends between each second stationary part 13 and the movable part 16. The support parts 14 are provided with the second comb-tooth parts 15 so that each of comb teeth of the comb-tooth part 15 is positioned between comb teeth of the first comb-tooth part 12. The movable part 16 extends in an X-axis direction so as to pass through a space formed between the pair of first stationary parts 11 and a space formed between the pair of second stationary parts 13. A portion of the insulating layer 3, which is positioned directly beneath the support parts 14, the second comb-tooth parts 15, and the movable part 16, is removed, so that the support parts 14, the second comb-tooth parts 15, and the movable part 16 are in states in which the support parts 14, the second comb-tooth parts 15, and the movable part 16 float above the substrate 2. The second stationary parts 13, the support parts 14, the second comb-tooth parts 15, and the movable part 16 are integrally formed of a part of the semiconductor layer 4. Each of the second stationary parts 13 is provided with a second electrode 18.

Since each of the support parts 14 has a structure in which leaf springs are connected, the movable part 16 can be moved in a direction (predetermined direction) A parallel to the X-axis direction. The support parts 14 apply an elastic force to the movable part 16 so that the movable part 16 returns to an initial position. Accordingly, when a voltage is applied between the first and second electrodes 17 and 18, electrostatic attraction acts between the first and second comb-tooth parts 12 and 15 according to the voltage (potential difference) and the movable part 16 is moved in the direction A to a position where the electrostatic attraction and the elastic force applied by the support parts 14 balance with each other.

The first interference optical system 20 includes a first movable mirror 21, a first stationary mirror 22, and an optical block 23, and forms a Michelson interference optical system. First light L1 is incident on the first interference optical system 20 through a first light incident part 6, and an interference wave L10 of the first light is emitted from the first interference optical system 20 through a first light-emitting part 7. The first light incident part 6 and the first light-emitting part 7 are, for example, optical fibers and are fixed to the frame part 41.

The first movable mirror 21 is provided at one end portion 16a of the movable part 16 in the direction A. The first movable mirror 21 includes a reflective surface 21a. The reflective surface 21a is a surface perpendicular to the direction A. The first stationary mirror 22 is provided on one side surface of the optical block 23. That is, the position of the first stationary mirror 22 is fixed. The first stationary mirror 22 includes a reflective surface 22a. The reflective surface 22a is a surface perpendicular to an X-Y plane, and is inclined with respect to the direction A at a predetermined angle. The optical block 23 is formed of a part of the semiconductor layer 4, and is fixed to the substrate 2 with the insulating layer 3 interposed therebetween. The side surface of the optical block 23 facing the first movable mirror 21 functions as a first beam splitter 23a. That is, the position of the first beam splitter 23a is fixed. The first beam splitter 23a is a surface perpendicular to the X-Y plane, and is inclined with respect to the direction A at an angle of 45°.

The first light L1, which is incident on the first interference optical system 20 through the first light incident part 6, travels in the optical block 23, and is split into first light travelling to the first movable mirror 21 and first light travelling to the first stationary mirror 22 by the first beam splitter 23a. First light L1a split to travel to the first stationary mirror 22 is reflected by the reflective surface 22a of the first stationary mirror 22 and returns to the first beam splitter 23a along the same optical path. On the other hand, first light L1b split to travel to the first movable mirror 21 along the direction A is reflected by the reflective surface 21a of the first movable mirror 21 and returns to the first beam splitter 23a along the same optical path. Further, the first light L1a and the first light L1b, which return to the first beam splitter 23a, are composed by the first beam splitter 23a and form an interference wave L10 of the first light. The interference wave L10 of the first light is emitted from the first interference optical system 20 through the first light-emitting part 7. The first interference optical system 20, which obtains the interference wave L10 of the first light, is adapted so that the first light L1b reciprocates one time between the first beam splitter 23a and the first movable mirror 21 along the direction A in this way.

The second interference optical system 30 includes a second movable mirror 31, a second stationary mirror 32, and optical blocks 33 and 34, and forms a Michelson interference optical system. Second light L2 is incident on the second interference optical system 30 through a second light incident part 8, and an interference wave L20 of the second light is emitted from the second interference optical system 30 through a second light-emitting part 9. The second light incident part 8 and the second light-emitting part 9 are, for example, optical fibers and are fixed to the frame part 41.

The second movable mirror 31 is provided at the other end portion 16b of the movable part 16 in the direction A. The second movable mirror 31 includes reflective surfaces 31a, 31b, and 31c. The reflective surface 31a is a surface perpendicular to the X-Y plane, and is inclined with respect to the direction A at an angle of 45°. The reflective surface 31b is a surface perpendicular to the X-Y plane, and is inclined to the side opposite to the reflective surface 31a with respect to the direction A at an angle of 45°. The reflective surface 31c is a surface perpendicular to the direction A. The second stationary mirror 32 is provided on one side surface of the optical block 33. That is, the position of the second stationary mirror 32 is fixed. The second stationary mirror 32 includes a reflective surface 32a. The reflective surface 32a is a surface perpendicular to the X-Y plane, and is inclined with respect to the direction A at a predetermined angle.

The respective optical blocks 33 and 34 are formed of a part of the semiconductor layer 4, and are fixed to the substrate 2 with the insulating layer 3 interposed therebetween. The side surface of the optical block 33 facing the second movable mirror 31 functions as a second beam splitter 33a. That is, the position of the second beam splitter 33a is fixed. The second beam splitter 33a is a surface perpendicular to the X-Y plane, and is inclined with respect to the direction A at an angle of 45°. The side surface of the optical block 34 facing the second movable mirror 31 functions as a reflective surface 34a. That is, the position of the reflective surface 34a is fixed. The reflective surface 34a is a surface perpendicular to the X-Y plane, and is inclined to the side opposite to the second beam splitter 33a with respect to the direction A at an angle of 45°.

The second light L2, which is incident on the second interference optical system 30 through the second light incident part 8, travels in the optical block 33, and is split into second light travelling to the second movable mirror 31 and second light travelling to the second stationary mirror 32 by the second beam splitter 33a. Second light L2a split to travel to the second stationary mirror 32 is reflected by the reflective surface 32a of the second stationary mirror 32 and returns to the second beam splitter 33a along the same optical path. On the other hand, second light L2b split to travel to the second movable mirror 31 along the direction A is sequentially reflected by the reflective surfaces 31a and 31b of the second movable mirror 31 and travels to the second beam splitter 33a along the direction A. The second light L2b, which travels to the second beam splitter 33a along the direction A, is sequentially reflected by the second beam splitter 33a and the reflective surface 34a of the optical block 34, and travels to the reflective surface 31c of the second movable mirror 31 along the direction A. The second light L2b, which travels to the reflective surface 31c along the direction A, is reflected by the reflective surface 31c, and returns to the second beam splitter 33a along the same optical path. Then, the second light L2a and the second light L2b, which return to the second beam splitter 33a, are composed by the second beam splitter 33a and form the interference wave L20 of the second light. The interference wave L20 of the second light is emitted from the second interference optical system 30 through the second light-emitting part 9. The second interference optical system 30, which obtains the interference wave L20 of the second light, is adapted so that the second light L2b reciprocates two times between the second beam splitter 33a and the second movable mirror 31 along the direction A in this way.

As illustrated in FIG. 2, the cap 5 includes a top plate portion 51, a frame portion 52, and protruding portions 53 and 54. The frame portion 52 is provided on the surface of the top plate portion 51 facing the substrate 2 so as to overlap the frame part 41 when viewed in a Z-axis direction. The frame portion 52 is airtightly joined to the frame part 41. The protruding portions 53 are provided on the surface of the top plate portion 51 facing the substrate 2 so as to correspond to portions of the first stationary parts 11 that are provided with the first electrodes 17. The protruding portions 53 are airtightly joined to the portions of the first stationary parts 11 that are provided with the first electrodes 17. The protruding portions 54 are provided on the surface of the top plate portion 51 facing the substrate 2 so as to correspond to the second stationary parts 13. The protruding portions 54 are airtightly joined to the second stationary parts 13. The top plate portion 51, the frame portion 52, and the protruding portions 53 and 54 are made of, for example, silicon so as to be integrally formed. For example, glass, such as quartz, may be used as the materials of the top plate portion 51, the frame portion 52, and the protruding portions 53 and 54.

Through holes 53a and 54a are formed in the cap 5. The through holes 53a pass through the top plate portion 51 and the protruding portions 53 along the Z-axis direction. The through holes 54a pass through the top plate portion 51 and the protruding portions 54 along the Z-axis direction. In the optical module 1A, electrical contact with the first electrode 17 from the outside through the through holes 53a is realized and electrical contact with the second electrode 18 from the outside through the through holes 54a is realized.

Here, the phase of the second light L2b in the second interference optical system 30 will be described. When the second light L2b, which travels to the second movable mirror 31 along the direction A, is reflected by the second movable mirror 31 and returns to the second beam splitter 33a along the same optical path, a double phase shift occurs with respect to a moving distance 1 of the second movable mirror 31. That is, a phase difference $\Phi_X$, which occurs on the second light L2b having a wavelength $\lambda_L$ with respect to the moving distance X of the second movable mirror 31, satisfies "$\Phi_X=2\pi\times(2X/\lambda_L)$". In contrast, the second light L2b reciprocates two times between the second beam splitter 33a and the second movable mirror 31 along the direction A as described above. Accordingly, a phase difference $\Phi_L$, which occurs on the second light L2b having a wavelength $\lambda_L$ with respect to the moving distance X of the second movable mirror 31, satisfies "$\Phi_L=2\pi\times(4X/\lambda_L)=2\pi\times\{2X/(\lambda_L/2)\}$". This is equivalent to the use of light having a wavelength $\lambda_L/2$ as the second light L2, and means that a resolution for the detection of a position based on the interference wave L20 of the second light is high.

As described above, in the optical module 1A, the first light L1 is split into first light travelling to the first movable mirror 21 and first light travelling to the first stationary mirror 22 by the first beam splitter 23a, and the first light L1b split to travel to the first movable mirror 21 and the first light L1a split to travel to the first stationary mirror 22 are composed by the first beam splitter 23a after the first light L1b split to travel to the first movable mirror 21 reciprocates one time along the direction A. On the other hand, the second light L2 is split into second light travelling to the second movable mirror 31 and second light travelling to the second stationary mirror 32 by the second beam splitter 33a, and the second light L2b split to travel to the second movable mirror 31 and the second light L2a split to travel to the second stationary mirror 32 are composed by the second beam splitter 33a after the second light L2b split to travel to the second movable mirror 31 reciprocates two times along the direction A. Accordingly, a phase difference occurring on the interference wave L20 of the second light is double a phase difference that occurs on the interference wave L20 of the second light in a case in which the second light L2b travelling to the second movable mirror 31 reciprocates, for example, one time along the direction A. This is equivalent to the use of light having a half of a wavelength as the second light L2, and means that a resolution for the detection of a position based on the interference wave L20 of the second light is high. Here, since the first and second movable mirrors 21 and 31 are provided on the movable part 16, the first and second movable mirrors 21 and 31 are moved along the direction A while being synchronized with each other (that is, at the same timing to the same side by the same moving distance). Accordingly, it is possible to detect the position of the first movable mirror 21 in the direction A by detecting the position of the second movable mirror 31 in the direction A on the basis of the interference wave L20 of the second light. It is possible to accurately detect the position of the first movable mirror 21, which forms the first interference optical system 20 serving as an interference optical system for measurement, by using the first light L1 as light for measurement and using the second light L2 as light for the detection of a position as described above.

Meanwhile, in the optical module 1A, a laser light may be used as the second light L2. In this case, even though the number of times of reciprocation of the second light L2b, which travels to the second movable mirror 31, along the direction A is increased for the further improvement of a resolution for the detection of a position based on the interference wave L20 of the second light, the interference wave L20 of the second light can be efficiently obtained.

Further, in the optical module 1A, the first movable mirror 21 is provided at one end portion 16a of the movable part 16 in the direction A and the second movable mirror 31 is provided at the other end portion 16b of the movable part 16 in the direction A. Accordingly, the movable part 16 can be moved with a good balance along the direction A.

Furthermore, in the optical module 1A, the first light L1 is incident on the first interference optical system 20 through the first light incident part 6 and the interference wave L10 of the first light is emitted from the first interference optical system 20 through the first light-emitting part 7. Likewise, the second light L2 is incident on the second interference optical system 30 through the second light incident part 8, and the interference wave L20 of the second light is emitted from the second interference optical system 30 through the second light-emitting part 9. That is, during the use of the optical module 1A, for example, a white light source is connected to the light incident end of the first light incident part 6, which is an optical fiber, and a light detection element is connected to the light-emitting end of the first light-emitting part 7 that is an optical fiber. Likewise, for example, a laser source is connected to the light incident end of the second light incident part 8, which is an optical fiber, and a light detection element is connected to the light-emitting end of the second light-emitting part 9 that is an optical fiber. Since the light sources and the light detection elements do not need to be mounted on the optical module 1A as described above, the degree of freedom in designing the first and second interference optical systems 20 and 30 can be improved.

Second Embodiment

Figure 3:
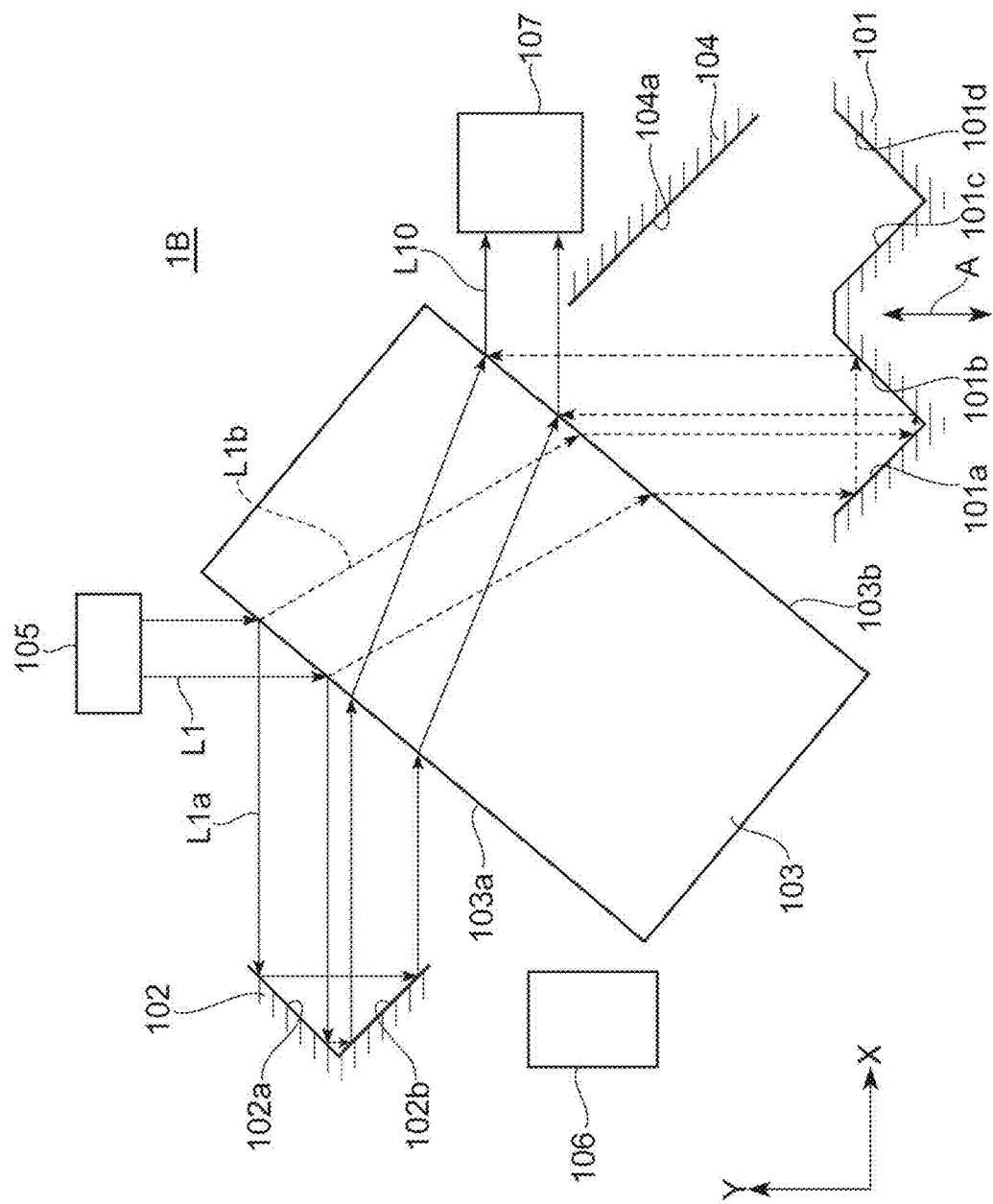
FIG. 3 is a plan view of a part of an optical module of a second embodiment.
Figure 4:
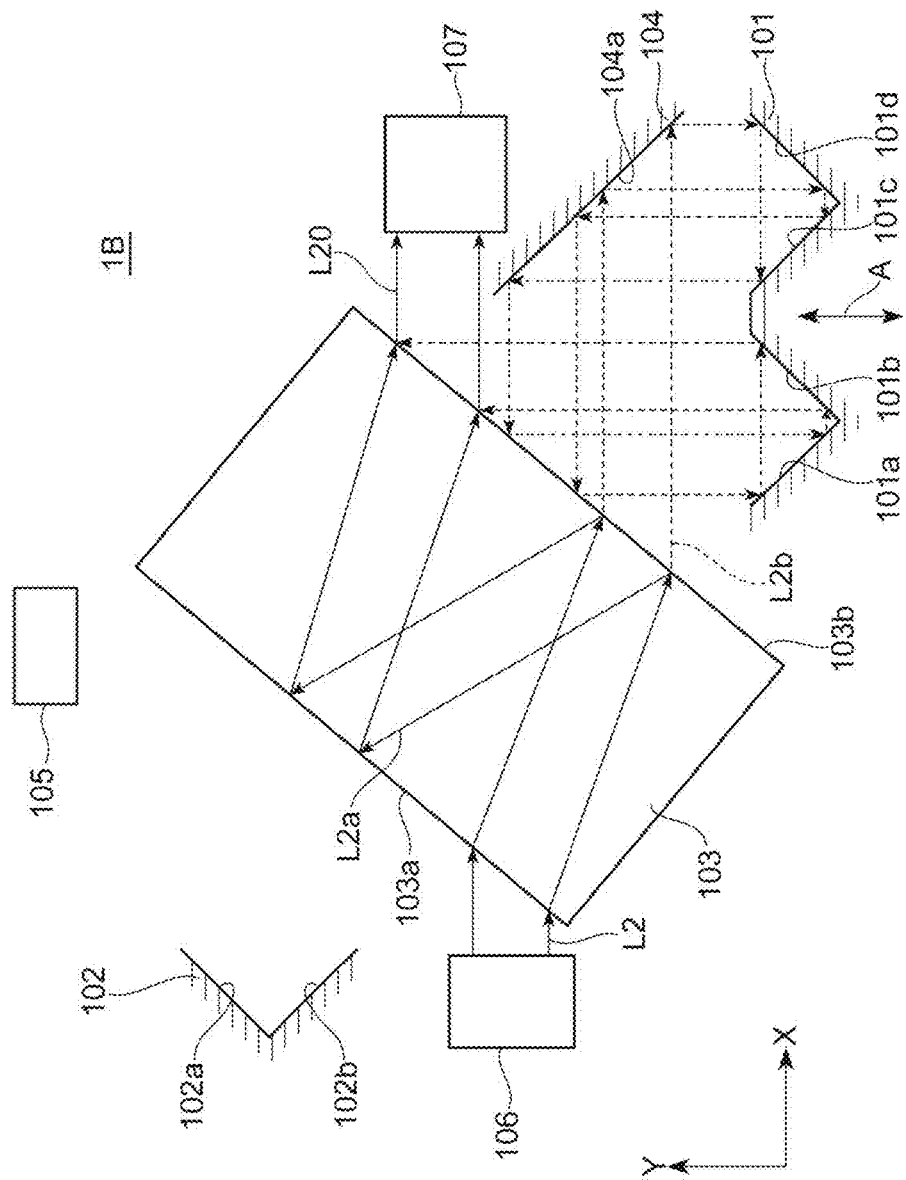
FIG. 4 is a plan view of a part of the optical module of the second embodiment.

As illustrated in FIGS. 3 and 4, an optical module 1B includes a movable mirror 101, stationary mirrors 102 and 104, and an optical block 103. Although not illustrated, components of the optical module 1B, such as an actuator 10, are the same as those of the above-mentioned optical module 1A.

The movable mirror 101 is provided at one end portion 16a (not illustrated) of the movable part 16 in a direction A parallel to a Y-axis direction. The movable mirror 101 includes reflective surfaces 101a, 101b, 101c, and 101d. The reflective surface 101a is a surface perpendicular to an X-Y plane, and is inclined with respect to the direction A at an angle of 45°. The reflective surface 101b is a surface perpendicular to the X-Y plane, and is inclined to the side opposite to the reflective surface 101a with respect to the direction A at an angle of 45°. The reflective surface 101c is a surface perpendicular to the X-Y plane, and is inclined to the side opposite to the reflective surface 101b with respect to the direction A at an angle of 45°. The reflective surface 101d is a surface perpendicular to the X-Y plane, and is inclined to the side opposite to the reflective surface 101c with respect to the direction A at an angle of 45°.

The stationary mirror 102 includes reflective surfaces 102a and 102b. The reflective surface 102a is a surface perpendicular to the X-Y plane, and is inclined with respect to the direction A at an angle of 45°. The reflective surface 102b is a surface perpendicular to the X-Y plane, and is inclined to the side opposite to the reflective surface 102a with respect to the direction A at an angle of 45°. The stationary mirror 104 includes a reflective surface 104a. The reflective surface 104a is a surface perpendicular to the X-Y plane, and is inclined with respect to the direction A at an angle of 45°. For example, the respective stationary mirrors 102 and 104 are formed of a part of the semiconductor layer 4, and are side surfaces of optical blocks (not illustrated) that are fixed to the substrate 2 with the insulating layer 3 interposed therebetween.

The optical block 103 includes light incident/emitting surfaces 103a and 103b. Each of the light incident/emitting surfaces 103a and 103b is a surface perpendicular to the X-Y plane, and is inclined with respect to the direction A at an angle of 45°. The optical block 103 is formed of a part of the semiconductor layer 4, and is fixed to the substrate 2 with the insulating layer 3 interposed therebetween.

The optical module 1B further includes a light incident part (first light incident part) 105, a light-emitting element 106, and a light-receiving element 107. The light incident part 105 allows first light L1 to be incident. The light incident part 105 is, for example, an optical fiber, and is fixed to the frame part 41. The light-emitting element 106 outputs second light L2. The light-emitting element 106 is, for example, a laser source, such as a semiconductor laser, and is mounted on the optical module 1B. The light-receiving element 107 detects an interference wave L10 of the first light and an interference wave L20 of the second light. The light-receiving element 107 is, for example, a light detection element, such as a photodiode, and is mounted on the optical module 1B.

As illustrated in FIG. 3, the first light L1, which is incident through the light incident part 105, is split into first light travelling to the movable mirror 101 and first light travelling to the stationary mirror 102 by the light incident/emitting surface 103a of the optical block 103. First light L1a split to travel to the stationary mirror 102 is sequentially reflected by the reflective surfaces 102a and 102b of the stationary mirror 102, and is incident on the light incident/emitting surface 103a of the optical block 103. The first light L1a, which is incident on the light incident/emitting surface 103a, travels in the optical block 103, and reaches the light incident/emitting surface 103b of the optical block 103. On the other hand, first light L1b split to travel to the movable mirror 101 travels in the optical block 103, and is emitted from the light incident/emitting surface 103b of the optical block 103. The first light L1b, which is emitted along the direction A from the light incident/emitting surface 103b, is sequentially reflected by the reflective surfaces 101a and 101b of the movable mirror 101, and reaches the light incident/emitting surface 103b of the optical block 103 along the direction A. Then, the first light L1a and the first light L1b, which reach the light incident/emitting surface 103b, are composed by the light incident/emitting surface 103b, and form the interference wave L10 of the first light. The interference wave L10 of the first light is incident on the light-receiving element 107.

In this case, the movable mirror 101, the stationary mirror 102, and the light incident/emitting surface 103a of the optical block 103 have the same functions as the first movable mirror 21, the first stationary mirror 22, and the first beam splitter 23a of the above-mentioned optical module 1A, respectively. That is, in this case, the movable mirror 101, the stationary mirror 102, and the optical block 103 have the same functions as the first interference optical system 20 that obtains the interference wave L10 of the first light, and allow the first light L1b to reciprocate one time between the light incident/emitting surface 103a of the optical block 103 and the movable mirror 101 along the direction A.

As illustrated in FIG. 4, the second light L2 emitted from the light-emitting element 106 is incident on the light incident/emitting surface 103a of the optical block 103 and travels in the optical block 103. The second light L2, which travels in the optical block 103, is split into second light travelling to the movable mirror 101 and second light travelling to the light incident/emitting surface 103a by the light incident/emitting surface 103b of the optical block 103. Second light L2a split to travel to the light incident/emitting surface 103a is reflected by the light incident/emitting surface 103a and reaches the light incident/emitting surface 103b of the optical block 103. On the other hand, second light L2b split to travel to the movable mirror 101 is reflected by the reflective surface 104a of the stationary mirror 104, and travels to the movable mirror 101 along the direction A. The second light L2b, which travels to the movable mirror 101 along the direction A, is sequentially reflected by the reflective surfaces 101d and 101c of the movable mirror 101, and travels to the stationary mirror 104 along the direction A. The second light L2b, which travels to the stationary mirror 104, is reflected by the reflective surface 104a of the stationary mirror 104, and travels to the light incident/emitting surface 103b of the optical block 103. The second light L2b, which travels to the light incident/emitting surface 103b, is reflected by the light incident/emitting surface 103b, and travels to the movable mirror 101. The second light L2b, which travels to the movable mirror 101 along the direction A, is sequentially reflected by the reflective surfaces 101a and 101b of the movable mirror 101, and reaches the light incident/emitting surface 103b of the optical block 103 along the direction A. Then, the second light L2a and the second light L2b, which reach the light incident/emitting surface 103b, are composed by the light incident/emitting surface 103b, and form an interference wave L20 of the second light. The interference wave L20 of the second light is incident on the light-receiving element 107.

In this case, the movable mirror 101, the light incident/emitting surface 103a of the optical block 103, and the light incident/emitting surface 103b of the optical block 103 have the same functions as the second movable mirror 31, the second stationary mirror 32, and the second beam splitter 33a of the above-mentioned optical module 1A, respectively. That is, in this case, the movable mirror 101, the stationary mirror 104, and the optical block 103 have the same functions as the second interference optical system 30 that obtains the interference wave L20 of the second light, and allow the second light L2b to reciprocate two times between the light incident/emitting surface 103*b* of the optical block 103 and the movable mirror 101 along the direction A.

As described above, in the optical module 1B, as illustrated in FIG. 3, the first light L1 is split into the first light travelling to the movable mirror 101 and the first light travelling to the stationary mirror 102 by the light incident/emitting surface 103*a* of the optical block 103, and the first light L1*a* split to travel to the stationary mirror 102 and the first light L1*b* split to travel to the movable mirror 101 are composed by the light incident/emitting surface 103*b* of the optical block 103 after the first light L1*b* split to travel to the movable mirror 101 reciprocates one time along the direction A. On the other hand, as illustrated in FIG. 4, the second light L2 is split into the second light travelling to the movable mirror 101 and the second light travelling to the light incident/emitting surface 103*a* of the optical block 103 by the light incident/emitting surface 103*b* of the optical block 103, and the second light L2*b* split to travel to the movable mirror 101 and the second light L2*a* split to travel to the light incident/emitting surface 103*a* are composed by the light incident/emitting surface 103*b* after the second light L2*b* split to travel to the movable mirror 101 reciprocates two times along the direction A. Accordingly, a phase difference occurring on the interference wave L20 of the second light is double a phase difference that occurs on the interference wave L20 of the second light in a case in which the second light L2*b* travelling to the movable mirror 101 reciprocates, for example, one time along the direction A. This is equivalent to the use of light having a half of a wavelength as the second light L2, and means that a resolution for the detection of a position based on the interference wave L20 of the second light is high. It is possible to accurately detect the position of the movable mirror 101, by using the first light L1 as light for measurement and using the second light L2 as light for the detection of a position as described above.

Further, in the optical module 1B, a laser light is used as the second light L2. Accordingly, even though the number of times of reciprocation of the second light L2*b*, which travels to the movable mirror 101, along the direction A is increased for the further improvement of a resolution for the detection of a position based on the interference wave L20 of the second light, the interference wave L20 of the second light can be efficiently obtained.

Furthermore, since the movable mirror 101 is provided at one end portion 16*a* of the movable part 16 in the direction A in the optical module 1B, the movable mirror 101 has a structure equivalent to a structure in which the first and second movable mirrors 21 and 31 of the above-mentioned optical module 1A share at least a part thereof. Accordingly, the optical module 1B can be reduced in size.

Moreover, the light-emitting element 106 emitting the second light L2 and the light-receiving element 107 detecting the interference wave L10 of the first light and the interference wave L20 of the second light are mounted on the optical module 1B. Accordingly, the optical module 1B can be easily handled. Meanwhile, white light is often used as the light for measurement. In this case, since a measurement sample is irradiated with the first light L1 output from a white light source prepared outside as a light-emitting element for measurement and a reflected wave or a transmitted wave of the first light L1 is incident on the optical module 1B, the need to mount the light-emitting element for measurement on the optical module 1B is low.

[Method of Detecting Position of Movable Mirror]

In the above-mentioned first and second embodiments, the position of the movable mirror (first movable mirror 21, movable mirror 101) is detected on the basis of an interference wave of a laser light (the interference wave L20 of the second light). As a method of detecting the position of the movable mirror, there are a voltage monitoring method and an electrostatic capacity monitoring method other than a method of monitoring a laser light that is used in the above-mentioned first and second embodiments.

The voltage monitoring method is a method of detecting the position of the movable mirror on the basis of a voltage that is applied between the first and second electrodes 17 and 18. In the actuator 10 illustrated in FIG. 1, the moving distance of the movable mirror is proportional to the square of a voltage. Accordingly, since the moving distance becomes sensitive to a voltage as the moving distance is increased, a voltage needs to be more accurately detected. One of reasons why the position of the movable mirror is hard to be calculated with the same accuracy over the entire movable range of the movable mirror has been described, but problems in principle are also present.

The voltage monitoring method is effective in a case in which the operating speed of the actuator 10 is relatively low, but is not simple in a case in which the operating speed of the actuator 10 is relatively high. This is caused by the fact that the actuator 10 has a resonant frequency. The resonant operation of a machine is expressed by a resonant frequency that is the center frequency of a resonant operation, and a Q value that means the spread of the resonant frequency. This means that a certain level of resonant operation occurs even near the resonant frequency as long as the Q value is not infinite. The range of an influence of the resonant operation (frequency range) is related to the magnitude of the Q value, and the influence appears up to a lower frequency as the Q value is smaller. When the machine performs a resonant operation, the amplitude (moving distance) and phase of the resonant operation do not completely coincide with an applied voltage. That is, even though the applied voltage is monitored, the movable mirror does not perform an operation corresponding to the applied voltage.

In a Fourier transform-type infrared spectrometer (hereinafter, referred to as a "MEMS-FTIR") in which a MEMS technology is used, the actuator 10 is generally operated at a resonant frequency or a frequency close to the resonant frequency. The reason for this is that the applied voltage can be reduced and measurement time can be shortened (alternatively, the reason for this is that the number of samples to be capable of being measured in the same time can be increased, which results in the improvement of an S/N ratio). Accordingly, the voltage monitoring method is generally not helpful in the MEMS-FTIR.

Next, an electrostatic capacity monitoring method is a method of detecting the position of the movable mirror on the basis of electrostatic capacity that is formed between the first and second comb-tooth parts 12 and 15. Since the electrostatic capacity monitoring method can be realized through only the formation of an electronic circuit and does not require the addition of a structure to the MEMS device, the electrostatic capacity monitoring method is presently employed in many MEMS devices. However, there is also a problem in the electrostatic capacity monitoring method.

Generally, in the MEMS-FTIR, the moving distance of a movable mirror is about 250 μm, that is, is about 500 μm as an optical path length (OPD). A wavelength accuracy depends on the accuracy of the determination of the OPD. For example, a relative accuracy of $2 \times 10^{-6}$ (=1 nm/500 μm)

is required to obtain a wavelength accuracy of 1 nm. Generally, since electrostatic capacity, which is formed between the first and second comb-tooth parts 12 and 15, is about several pF to 10 pF, 20 aF (=10 pF×2×10$^{-6}$) is required as the accuracy of measurement of capacity. In a case in which about 10 dB is considered as an S/N ratio required to stably measure this value, the noise level of a measurement system should be reduced to 2 aF or less.

It cannot be said that this is a simple level, and a fairly advanced capacity measurement algorithm and electronic circuit design are required. In addition, temperature characteristics cannot be ignored as long as capacity is measured by the electronic circuit. Accordingly, since the correction of a temperature should also be considered finally, the degree of difficulty becomes higher. For this reason, since ensuring a wavelength accuracy in the range of about several nm to 10 nm is actually a limitation, it is not possible to ensure a wavelength accuracy of 1 nm.

Next, the laser light monitoring method is a method of detecting the position of the movable mirror on the basis of the interference wave of the laser light. In the past, the laser light monitoring method has been employed in a stationary Fourier transform-type infrared spectrometer (hereinafter, referred to as a "stationary FTIR"), but has not been employed in the MEMS-FTIR. The reason for this is as follows.

Figure 5:
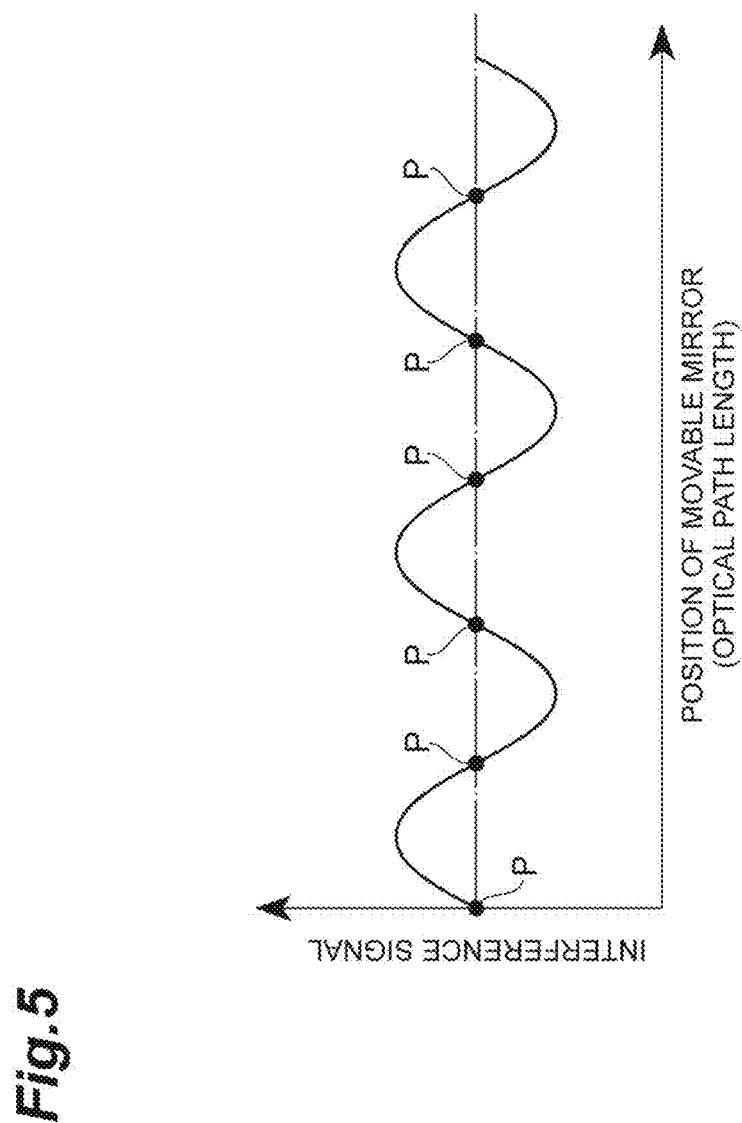
FIG. 5 is a graph illustrating a relationship between the position of a movable mirror (optical path length) and an interference signal.

As illustrated in FIG. 5, points P are positioning points in a case in which a horizontal axis represents the position of the movable mirror (optical path length) and a vertical axis represents an interference signal of a laser light. The points P are cross points where the interference signal and an average value (DC component) of the interference signal cross each other, and indicate optical positions, such as 0, $\lambda_L/2$, $\lambda_L$, $3\lambda_L/2$, $2\lambda_L$, $5\lambda_L/2$, . . . , in a case in which the wavelength of a laser light is denoted by $\lambda_L$. The reason for this is that a point where the accuracy of the specification of a position is highest on a sine wave is a zero-cross point.

In this way, sampling points can be determined at an interval of $\lambda_L/2$ when a laser light having a wavelength $\lambda_L$ is used. Ideally, a zero-cross point may be used as a trigger to sample an actual signal.

On the other hand, there is a sampling theorem as an item that should be considered in Fourier transform-type data processing. The sampling theorem is a theorem where data needs to be sampled at a frequency that is equal to or larger than double the maximum wave number to be required in a case in which original signals are accurately reproduced from discrete data sampled at regular intervals.

For example, to obtain a wave number of 10000 cm$^{-1}$ (a wavelength of 1 µm), data should be sampled at a frequency of 20000 cm$^{-1}$ (at an interval of 0.5 µm as a wavelength). Accordingly, it is found that the wavelength $\lambda_L$ of a laser light required in this case should be 1 µm or less.

Incidentally, in the MEMS-FTIR, the side surface of an optical block made of silicon is used as a beam splitter and a split laser light travels in the optical block made of silicon. For this reason, a laser light having a wavelength of 1.1 µm or less is absorbed by the optical block. Accordingly, the minimum value of the wavelength of a laser light, which can be used in the MEMS-FTIR, is 1.1 µm. Here, it is easy to obtain a laser source having a wavelength of 1.3 µm and a laser source having a wavelength of 1.55 µm, but it is difficult to improve a resolution for the detection of a position based on an interference wave of a laser light.

Accordingly, in the above-mentioned first and second embodiments, an interference optical system for detecting a position (second interference optical system 30) is adapted so that a laser light reciprocates two or more times between the beam splitter and the movable mirror along the movable direction of the movable mirror. This means is equivalent to the use of a laser light having a shorter wavelength, and means that a resolution for the detection of a position based on an interference wave of a laser light is high. For example, in a case in which a laser light having a wavelength of 1.3 µm is used and the number of times of reciprocation of the laser light is set to two, this is equivalent to the use of a laser light having a wavelength of 0.65 µm and a wavelength range up to 1.1 µm can be sufficiently covered.

[Example of Calibration Using Optical Module of Second Embodiment]

First, an example of calibration to be performed before measurement will be described. In a case in which the actuator 10 is operated under certain conditions, a certain correlation is present between a voltage to be applied between the first and second electrodes 17 and 18 and the position of the movable mirror. For this reason, in a case in which the profile of a voltage to be applied is determined and the position of the movable mirror at the time of application of the voltage is monitored, data on the position of the movable mirror can be used as calibration data. That is, in a state in which the incidence of the light for measurement (first light L1) is cut off, the laser light for calibration (second light L2) is turned on to acquire calibration data. Subsequently, in a state in which a laser light for calibration (second light L2) is turned off, the light for measurement (first light L1) is incident and measurement is performed to acquire a measurement signal. In a case in which the measurement signal is corrected on the basis of the calibration data acquired in advance, a correct spectrum can be obtained. In a case in which a procedure for acquiring calibration data at regular intervals or the like is determined as necessary, data can be more stably acquired.

Figure 6:
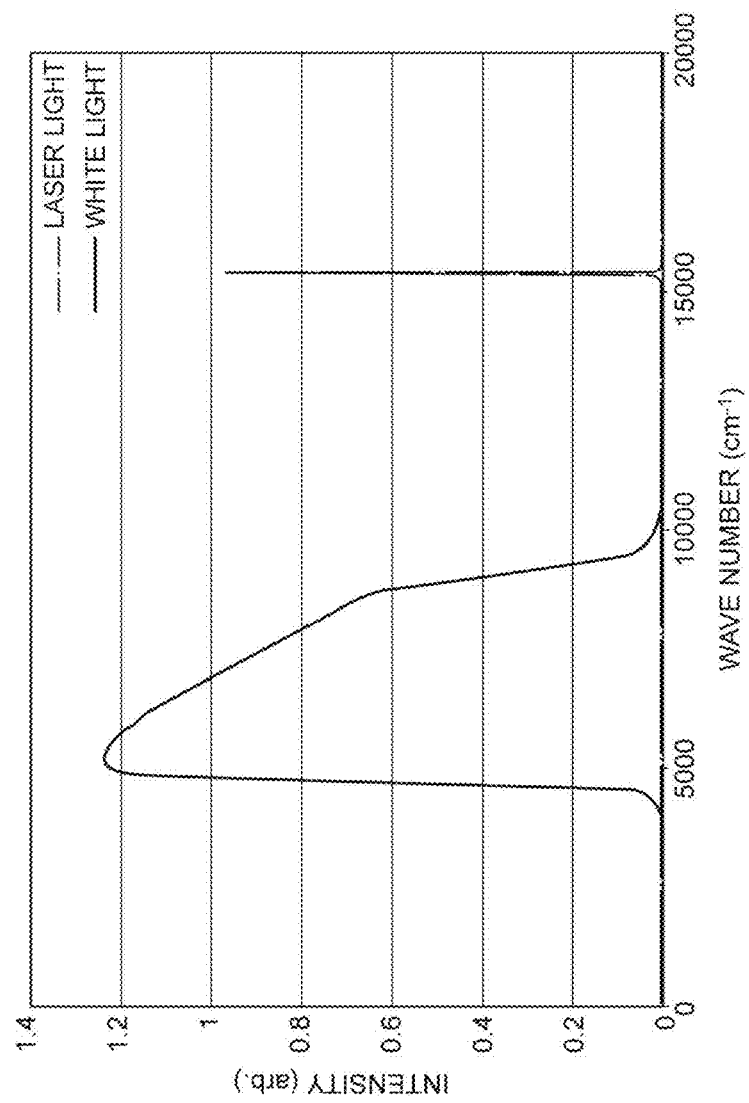
FIG. 6 is a graph illustrating the spectrums of a calibration signal and a measurement signal.

Next, an example of calibration for performing calibration before measurement and monitoring the stability of measurement will be described. In this example of calibration, the spectrum of a calibration signal appears in a region different from the spectrum of a measurement signal as illustrated in FIG. 6 even though the laser light for calibration (second light L2) is turned on during measurement. In FIG. 6, a spectrum indicated as a laser light is the spectrum of the calibration signal and a spectrum indicated as white light is the spectrum of the measurement signal.

For example, in a case in which InGaAs for a long wavelength is used as an infrared detection element, a sensitivity range is a range of about 4500 cm$^{-1}$ (a wavelength of 2.2 µm) to 9000 cm$^{-1}$ (a wavelength of 1.1 µm). The infrared detection element itself has a sensitivity up to 11000 cm$^{-1}$ (a wavelength of 0.9 µm), but light having a wave number of about 9000 cm$^{-1}$ or more (a wavelength of about 1.1 µm or more) is absorbed by silicon in the MEMS-FTIR as described above, so that the sensitivity of the infrared detection element becomes zero. On the other hand, since the wavelength of the laser light for calibration is 1.3 µm (a wave number of 7692 cm$^{-1}$), the spectrum of a calibration signal appears at 0.65 µm (a wave number of 15385 cm$^{-1}$) that is a position corresponding to a half of the wavelength of the laser light for calibration (double in the wave number).

Since the spectrum of the calibration signal appears in a region different from the spectrum of the measurement signal (a detection wavelength range as the MEMS-FTIR) in this way, the spectrum of the calibration signal and the spectrum of the measurement signal can be easily separated from each other. Also in the example of calibration for performing calibration before measurement and monitoring the stability of measurement, as in the example of calibration to be performed before measurement, calibration data is acquired in a stage supposed as the same environments as that during measurement and the calibration data is used during measurement.

The advantage of the example of calibration for performing calibration before measurement and monitoring the stability of measurement is to be capable of verifying whether or not a correction result is correct since the spectrum of the measurement signal and the spectrum of the calibration signal can be simultaneously acquired. The wavelength of a peak point of the spectrum of the calibration signal and the half-value width of the spectrum are compared with those at the time of acquisition of calibration data; and, it is determined that a calibration value deviates in a case in which a deviation occurs therebetween and a measurer may be warned to acquire calibration data again. Meanwhile, since white light for measurement is incoherent light, the need to consider the interference between the laser light for calibration and the white light for measurement is low.

Figure 7:
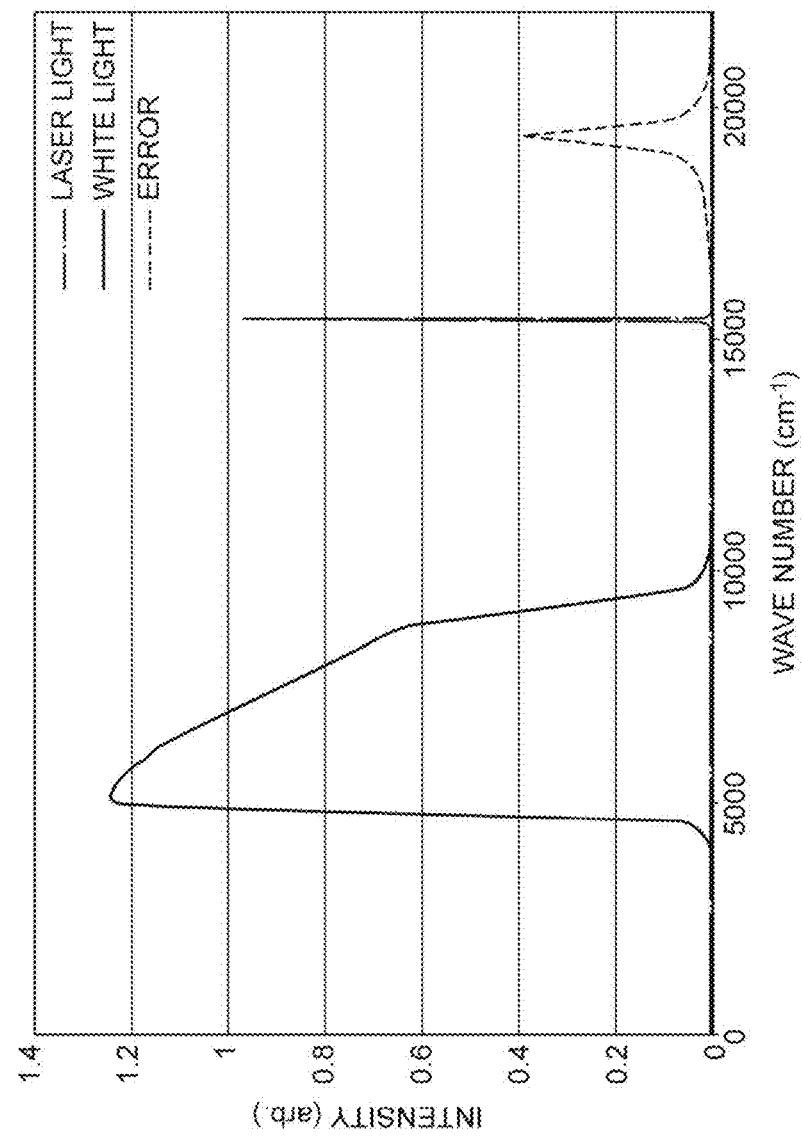
FIG. 7 is a graph illustrating the spectrums of a calibration signal and a measurement signal.

Next, an example of calibration for automatically performing calibration will be described. FIG. 7 illustrates an example of the spectrum of a calibration signal in a case in which an error occurs in calibration. In FIG. 7, a spectrum indicated as an error is the spectrum of a calibration signal at the time of occurrence of an error. A case in which the amplitude of the actuator 10 is increased by about 10% and the phase of an operation deviates from an operating period by about 10% is supposed in regard to calculation. For example, it is assumed that the frequency of a reference clock of an electronic circuit system deviates due to an influence of temperature when the actuator 10 is driven at a resonant frequency. Since a system is generally operated in synchronization with the reference clock, whether or not the frequency of the reference clock is correct cannot be determined as long as special means is not prepared. Accordingly, such a situation can be sufficiently supposed. A case in which the amplitude and phase of an operation deviate since the resonant frequency of the actuator 10 and a frequency where the system is to be actually driven deviate from each other in this case can also be supposed likewise.

In this example, the spectrum of an originally correct calibration signal is not to be detected, but the spectrum of an originally correct calibration signal is also illustrated in FIG. 7 for the purpose of comparison. Further, in a case in which an error occurs in calibration, the spectrum of the measurement signal also includes an error. For this reason, the spectrum of the measurement signal also has a shape different from the shape of the spectrum illustrated in FIG. 7, but the detail thereof will be omitted.

Here, the shape of the spectrum of a calibration signal at the time of occurrence of an error is to be noted. A central wavelength deviates, an amplitude is reduced, and the half-value width of a spectrum is increased, but there is no influence thereof on a measurement wavelength range. Conversely, an error also occurs on the spectrum of the measurement signal, but there is no influence thereof on the spectrum of the calibration signal. This means that the component of the measurement signal and the component of the calibration signal can be separated from each other on the spectrum even in a case in which an error occurs in calibration. In a case in which spectrum data is separated in this state and only data of the component of the calibration signal is subjected to inverse Fourier transform again by using the data of the calibration signal including an error, the real-time data of only the calibration signal can be acquired.

In a case in which calibration data is calculated again on the basis of the acquired real-time data of only the calibration signal and original data is subjected to Fourier transform by using the calibration data, a correct spectrum can be obtained. In this case, in a case in which whether or not the spectrum of the calibration signal having subjected to the transform is obtained as an original spectrum is checked by using data where the component of the calibration signal is also included in the real-time data to be used, it is possible to verify whether or not recalibration data is correct.

A case in which the spectrum of an original calibration signal is not obtained means that the degree of a deviation is large and the component of the calibration signal obtained using calibration data including an error is mixed to the component of the measurement signal and cannot be separated completely. In such a case, it is necessary to warn a measurer to perform recalibration.

Meanwhile, in the case of a minute deviation or the like caused by temperature characteristics, the distribution of the spectrum of the calibration signal is sufficiently falls in a certain range as illustrated in FIG. 7 and the calibration signal can be separated from the measurement signal. Accordingly, this method is sufficiently practical. A case in which a deviation large enough not to be recalibrated occurs means a case in which a phenomenon, which is not supposed, such as vibration or impact, occurs. The case of an environment where such a phenomenon frequently occurs is out of the range of specifications, and only data corresponding to an unexpected phenomenon has only to be deleted in the case of the unexpected phenomenon. If the measurement signal and the calibration signal are simultaneously monitored even in this case, the generation of abnormality can be detected in real time.

[Modification]

The first and second embodiments of the present disclosure have been described above, but the optical module of the present disclosure is not limited to the above-mentioned first and second embodiments. For example, the material and shape of each component are not limited to the above-mentioned material and shape, and various materials and various shapes can be employed as the material and shape of each component.

Further, the first light L1b has been allowed to reciprocate one time and the second light L2b has been allowed to reciprocate two times in the above-mentioned first and second embodiments, but the optical module of the present disclosure is not limited thereto. In the optical module of the present disclosure, the first interference optical system may be adapted so that the first light reciprocates m times (in is a natural number) between the first beam splitter and the first movable mirror along a predetermined direction (the movable direction of the movable part), and the second interference optical system may be adapted so that the second light reciprocates n times (n is a natural number greater than m) between the second beam splitter and the second movable mirror along a predetermined direction (the movable direction of the movable part). However, in a case in which in is 1 and n is 2, it is possible to detect the position of the movable mirror, which forms the interference optical system for measurement, (that is, the first movable mirror) with sufficient accuracy while inhibiting the structures of the first and second interference optical systems from being complicated.

Incidentally, since the interference wave L10 of the first light and the interference wave L20 of the second light can be separately acquired in the optical module 1A of the first embodiment, the interference wave L10 of the first light can be subjected to analog processing. Specifically, the interference wave L10 of the first light is allowed to pass through a high-pass filter first so that a DC component is cut. Subsequently, a rectangular signal, which is changed at points where the value of the signal is switched to a minus from a plus or to a plus from a minus, is obtained through a comparator. Then, the A/D conversion data of the measurement signal may be triggered by the rise and fall of the rectangular signal. On the other hand, since both the interference wave L10 of the first light and the interference wave L20 of the second light need to be received in the optical module 1B of the second embodiment as digital data, a sampling period needs to be set to at least 8 points and needs to be set to about 16 points when possible. Accordingly, there is a concern that an immoderate increase in the number of times of reciprocation may be the excess of specifications. Meanwhile, in the optical module 1A of the first embodiment, the interference wave L10 of the first light transmitted through the first light-emitting part 7 and the interference wave L20 of the second light transmitted through the second light-emitting part 9 may be made to join one optical fiber and to be incident on one light-receiving element.

Further, the optical module 1A of the first embodiment may include a light-emitting element outputting the second light L2 and a light-receiving element detecting the interference wave L20 of the second light instead of the second light incident part 8 and the second light-emitting part 9, and may further include a white light source, which outputs the first light L1, as the light-emitting element for measurement instead of the first light incident part 6. In this case, a measurement sample is irradiated with the interference wave L10 of the first light, which is output from the first light-emitting part 7, and a reflected wave or a transmitted wave of the interference wave L10 of the first light is received by a light-receiving element that is prepared outside. Accordingly, since the light-emitting element outputting the second light L2, the light-receiving element detecting the interference wave L20 of the second light, and the light-emitting element for measurement are mounted on the optical module 1A, the optical module 1A can be easily handled. Meanwhile, the interference wave L10 of the first light is received by a light-receiving element that is prepared outside. For this reason, the need to mount the light-receiving element, which detects the interference wave L10 of the first light, on the optical module 1A is low.

Furthermore, the optical module 1A of the first embodiment may include a light-emitting element outputting the second light L2 and a light-receiving element detecting the interference wave L20 of the second light instead of the second light incident part 8 and the second light-emitting part 9, and may further include a light-receiving element detecting the interference wave L10 of the first light instead of the first light-emitting part 7. In this case, a measurement sample is irradiated with the first light L1, which is output from the white light source prepared outside as the light-emitting element for measurement, and a reflected wave or a transmitted wave of the first light L1 is received by the light-receiving element through the first light incident part 6 and the first interference optical system 20. Accordingly, since the light-emitting element outputting the second light L2, the light-receiving element detecting the interference wave L20 of the second light, and the light-receiving element detecting the interference wave L10 of the first light are mounted on the optical module 1A, the optical module 1A can be easily handled. Meanwhile, the first light L1 is output from the white light source that is prepared outside as the light-emitting element for measurement. For this reason, the need to mount the light-emitting element for measurement on the optical module 1A is low.

Furthermore, the optical module 1B of the second embodiment may further include a second light incident part, which allows the second light L2 to be incident, and a light-emitting part, which emits the interference wave L10 of the first light and the interference wave L20 of the second light, instead of the light-emitting element 106 and the light-receiving element 107. In this case, during the use of the optical module 1B, for example, a white light source is connected to the light incident end of the light incident part 105 that is an optical fiber, a laser source is connected to the light incident end of the second light incident part that is an optical fiber, and a light detection element is connected to the light-emitting end of the light-emitting part that is an optical fiber. Since the light sources and the light detection elements do not need to be mounted on the optical module 1B as described above, the degree of freedom in designing the interference optical systems (first and second interference optical systems) can be improved.

Further, a first through-electrode electrically connected to each first stationary part 11 and a second through-electrode electrically connected to each second stationary part 13 may be provided on the substrate 2 and the insulating layer 3, and a voltage may be applied between the first and second through-electrodes. Furthermore, the actuator 10 is not limited to an electrostatic actuator, and may be, for example, a piezoelectric actuator, an electromagnetic actuator, or the like.

REFERENCE SIGNS LIST 1A, 1B: optical module, 6: first light incident part, 7: first light-emitting part, 8: second light incident part, 9: second light-emitting part, 10: actuator, 16: movable part, 16a: one end portion, 16b: other end portion, 20: first interference optical system, 21: first movable mirror, 22: first stationary mirror, 23a: first beam splitter, 30: second interference optical system, 31: second movable mirror, 32: second stationary mirror, 33a: second beam splitter, 101: movable mirror (first movable mirror, second movable mirror), 102: stationary mirror (first stationary mirror), 103a: light incident/emitting surface (first beam splitter, second stationary mirror), 103b: light incident/emitting surface (second beam splitter), 105: light incident part (first light incident part), 106: light-emitting element, 107: light-receiving element, A: direction (predetermined direction), L1, L1a, L1b: first light, L10: interference wave of first light, L2, L2a, L2b: second light, L20: interference wave of second light.

The invention claimed is:

1. An optical module comprising:
an actuator that includes a movable part to be moved along a predetermined direction;
a first interference optical system that includes a first movable mirror provided on the movable part and a first stationary mirror and a first beam splitter of which positions are fixed, and obtains an interference wave of first light; and
a second interference optical system that includes a second movable mirror provided on the movable part and a second stationary mirror and a second beam splitter of which positions are fixed, and obtains an interference wave of second light,
wherein the first interference optical system is adapted so that the first light reciprocates m times (m is a natural number) between the first beam splitter and the first movable mirror along the predetermined direction, and the second interference optical system is adapted so that the second light reciprocates n times (n is a natural number greater than m) between the second beam splitter and the second movable mirror along the predetermined direction.

2. The optical module according to claim 1, wherein m is 1 and n is 2.

3. The optical module according to claim 1, wherein the second light is a laser light.

4. The optical module according to claim 1, wherein the first movable mirror is provided at one end portion of the movable part in the predetermined direction, and the second movable mirror is provided at the other end portion of the movable part in the predetermined direction.

5. The optical module according to claim 4, further comprising:
a first light incident part that allows the first light to be incident;
a first light-emitting part that emits the interference wave of the first light;
a second light incident part that allows the second light to be incident; and
a second light-emitting part that emits the interference wave of the second light.

6. The optical module according to claim 4, further comprising:
a light-emitting element that outputs the second light; and
a light-receiving element that detects the interference wave of the second light.

7. The optical module according to claim 1, wherein the first movable mirror and the second movable mirror are provided at an end portion of the movable part in the predetermined direction, and share at least a part thereof.

8. The optical module according to claim 7, further comprising:
a first light incident part that allows the first light to be incident;
a second light incident part that allows the second light to be incident; and
a light-emitting part that emits the interference wave of the first light and the interference wave of the second light.

9. The optical module according to claim 7, further comprising:
a light-emitting element that outputs the second light; and
a light-receiving element that detects the interference wave of the first light and the interference wave of the second light.

* * * * *